United States Patent
Jang

(10) Patent No.: US 10,558,046 B2
(45) Date of Patent: Feb. 11, 2020

(54) DISPLAY SYSTEM FOR VIRTUAL REALITY AND METHOD OF DRIVING THE SAME

(71) Applicant: LG Display Co., Ltd., Seoul (KR)

(72) Inventor: Jun-Woo Jang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 31 days.

(21) Appl. No.: 15/607,157

(22) Filed: May 26, 2017

(65) Prior Publication Data

US 2017/0343821 A1   Nov. 30, 2017

(30) Foreign Application Priority Data

May 31, 2016   (KR) .................. 10-2016-0067268

(51) Int. Cl.
  *G02B 27/01*   (2006.01)
  *G06T 3/00*    (2006.01)
  *G06T 19/00*   (2011.01)
  *G02F 1/1362*  (2006.01)
  *G06F 3/01*    (2006.01)

(52) U.S. Cl.
  CPC ... *G02B 27/0172* (2013.01); *G02F 1/136209* (2013.01); *G06T 3/0012* (2013.01); *G06T 19/006* (2013.01); *G06F 3/013* (2013.01)

(58) Field of Classification Search
  None
  See application file for complete search history.

(56) References Cited

U.S. PATENT DOCUMENTS

| | | | | |
|---|---|---|---|---|
| 2003/0198393 A1* | 10/2003 | Berstis | .................... | G06F 3/013 382/239 |
| 2005/0238217 A1* | 10/2005 | Enomoto | ........... | G06K 9/00597 382/128 |
| 2007/0101072 A1* | 5/2007 | Jackson | .............. | G06F 13/4239 711/154 |
| 2009/0189850 A1* | 7/2009 | Murayama | ............. | G09G 3/344 345/107 |
| 2013/0057801 A1* | 3/2013 | Park | .................. | G02F 1/133308 349/58 |
| 2014/0249695 A1* | 9/2014 | Gettings | .............. | G05D 1/0022 701/2 |

(Continued)

FOREIGN PATENT DOCUMENTS

| | | |
|---|---|---|
| CN | 103139593 A | 6/2013 |
| CN | 103871357 A | 6/2014 |

(Continued)

OTHER PUBLICATIONS

Office Action issued in counterpart CN Application No. 201710379342.2 dated Jul. 24, 2019.

*Primary Examiner* — Saptarshi Mazumder
(74) *Attorney, Agent, or Firm* — Polsinelli PC

(57) ABSTRACT

A display system for virtual reality and a method of driving the same are disclosed. In the display system for virtual reality, auxiliary image data, the number of which is smaller than the number of auxiliary sub pixels disposed in an auxiliary view region, is transmitted to a display device and the same auxiliary image data is supplied to sub-pixels of an auxiliary view region in which a user eye is not accurately focused. Accordingly, the display system for virtual reality reduces a volume of auxiliary image data supplied to the auxiliary view region to overcome latency.

20 Claims, 9 Drawing Sheets

(56) References Cited

U.S. PATENT DOCUMENTS

2017/0316607 A1\* 11/2017 Khalid ................. G06T 19/006

FOREIGN PATENT DOCUMENTS

| CN | 103926694 A | 7/2014 |
|---|---|---|
| CN | 204143065 U | 2/2015 |
| CN | 104407700 A | 3/2015 |
| CN | 105404393 A | 3/2016 |
| JP | 2016031446 A | 3/2016 |

\* cited by examiner

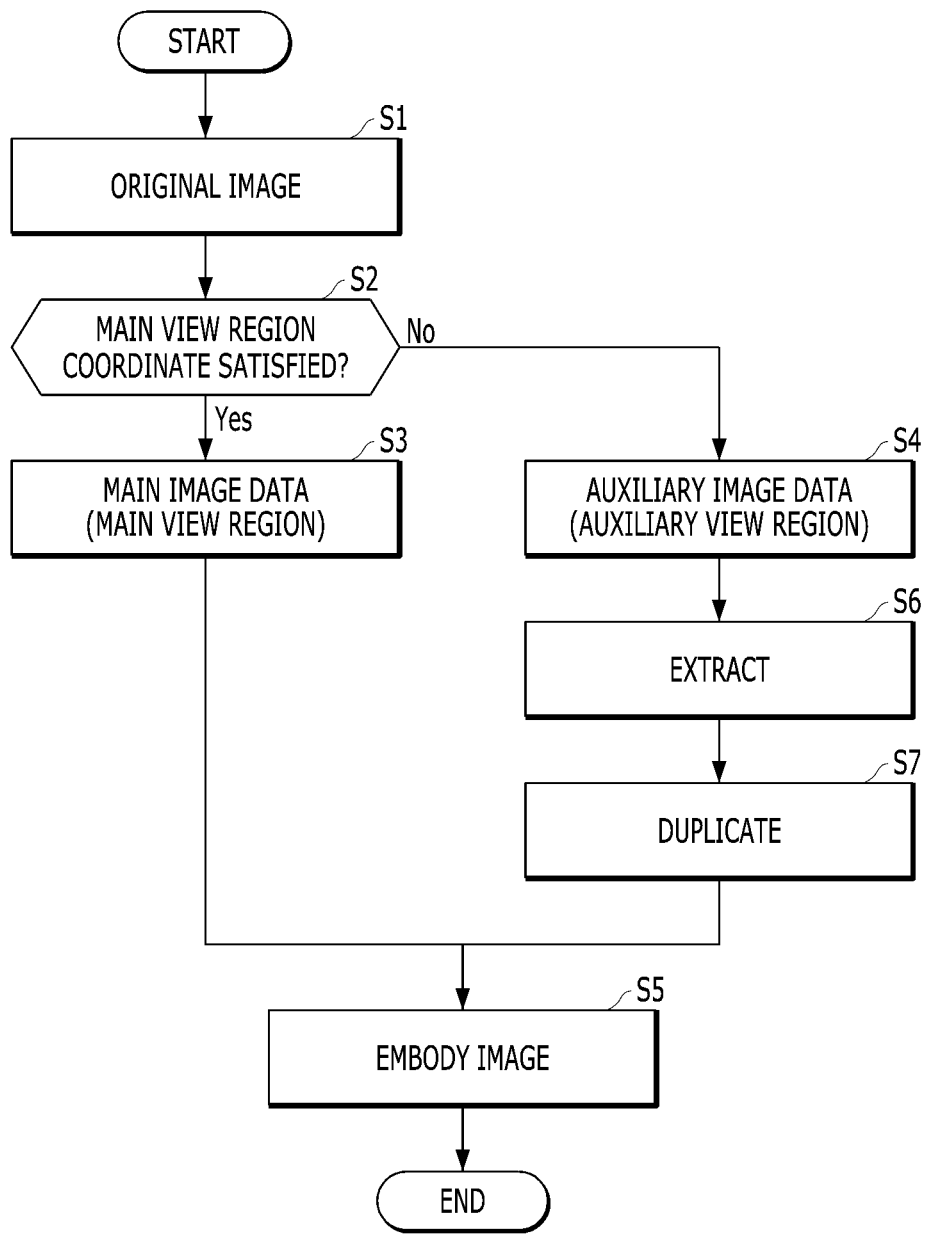

DISPLAY SYSTEM FOR VIRTUAL REALITY AND METHOD OF DRIVING THE SAME

This application claims the benefit of Korean Patent Application No. 10-2016-0067268, filed on May 31, 2016, which is hereby incorporated by reference as if fully set forth herein.

BACKGROUND

Field of the Disclosure

The present disclosure relates to a display system for virtual reality and a method of driving the same, for reducing the volume of an input image to overcome latency.

Discussion of the Background

A display system for virtual reality is a visualization apparatus that makes a user experience a virtual reality through image, sound, and other sensory inputs. The display system for virtual reality advantageously embodies a small system size yet a relatively large screen having an unlimited viewing angle and, accordingly, has been variously used over various fields of the augmented reality industry, education industry, a virtual reality (VR) experience device, a monitor of a wearable personal computer (PC), a theme park, movie appreciation, a game display device, amongst others.

However, a conventional virtual reality display system is configured to embody an image enlarged through a lens 12 very close to a user eye, as illustrated in FIG. 1 and, thus, black matrices between sub-pixels of a display panel 10 of the virtual reality display system is recognized. Accordingly, image quality degradation whereby lattice-type artifacts are recognized from an image displayed in a conventional virtual reality display apparatus occurs. Image quality degradation may be overcome by increasing resolution of the display panel 10. However, when resolution is increased, the number of sub-pixels of the display panel 10 is increased and, thus, the volume of an input image supplied to the sub-pixels is increased. Accordingly, there is a problem in that latency is proportional to the volume of an input image, so that as the volume is increased, so is the latency.

Here, latency refers to the time taken from viewpoint change until an image corresponding to a time point of the viewpoint change is displayed when a viewpoint of a user, who wears the virtual reality display system, is changed. Such latency is determined according to processing speed of at least a central processing unit (CPU) disposed in the virtual reality display system, graphic processing unit (GPU) processing speed, frame rate, response speed of a pixel cell (e.g., a liquid crystal cell or a light emitting cell). When latency exceeds 20 ms, the user can experience symptoms such as motion sickness or sense of difference with respect to a virtual reality environment.

Accordingly, there has been a need for a virtual reality display system that reduces latency while maintaining high resolution.

SUMMARY

Accordingly, the present disclosure is directed to a display system for virtual reality and a method of driving the same that substantially obviates one or more problems due to limitations and disadvantages of the related art.

An object of the present disclosure is to provide a display system for virtual reality and a method of driving the same, for reducing the volume of an input image to overcome latency.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a virtual reality display system is configured in such a way that auxiliary image data, which is smaller than the number of auxiliary sub pixels disposed in an auxiliary view region, is transmitted to a display device and the same auxiliary image data is supplied to sub-pixels of an auxiliary view region in which a user eye is not accurately focused. Accordingly, the display system for virtual reality reduces a volume of auxiliary image data supplied to the auxiliary view region to overcome latency.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 9 is a flowchart for explanation of a method of driving a virtual reality display system according to the present disclosure.

DETAILED DESCRIPTION DISCLOSURE

Reference will now be made in detail to the preferred embodiments of the present disclosure, examples of which are illustrated in the accompanying drawings.

Prior to a description of the present disclosure, increase in latency of a virtual reality display system according to the prior art of the present disclosure will be described.

The virtual reality display system embodies an image enlarged via a lens and, thus, a viewing angle for user recognition is wide, normally around 100 degrees. However, the human eyes are focused only on a main view region directed toward a front side of a display panel and are not accurately focused on an auxiliary view region. That is, although a viewing angle for user recognition is equal to or greater than 100 degrees, an object may be clearly recognized only at about 60 degrees as a main viewing angle corresponding to the main view region, which is typically where a user's eyes are focused. A user may not as clearly recognize the auxiliary viewing angle corresponding to the remaining auxiliary view region. Nevertheless, the conventional virtual reality display system embodies an image in the auxiliary view region using image data from a content provider without change, thus, contributing to problems with latency.

In order to overcome the problem of the prior art, a virtual reality display system according to the present disclosure performs blurring only in an auxiliary view region on which the human eyes are not accurately focused. Accordingly, the virtual reality display system according to the present disclosure may reduce an image data volume of an auxiliary view region on which the user eyes are not accurately focused without image quality degradation of a main view region on which the user eyes are accurately focused, thereby reducing latency.

Figure 1:
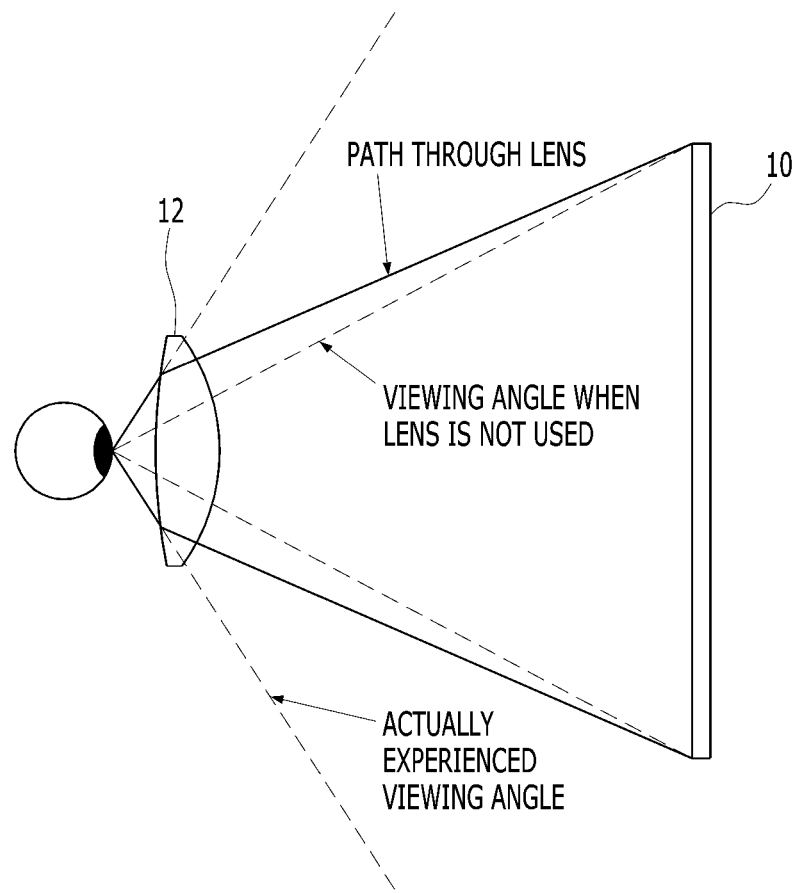
FIG. 1 is a diagram illustrating a conventional virtual reality display system.
Figure 2:
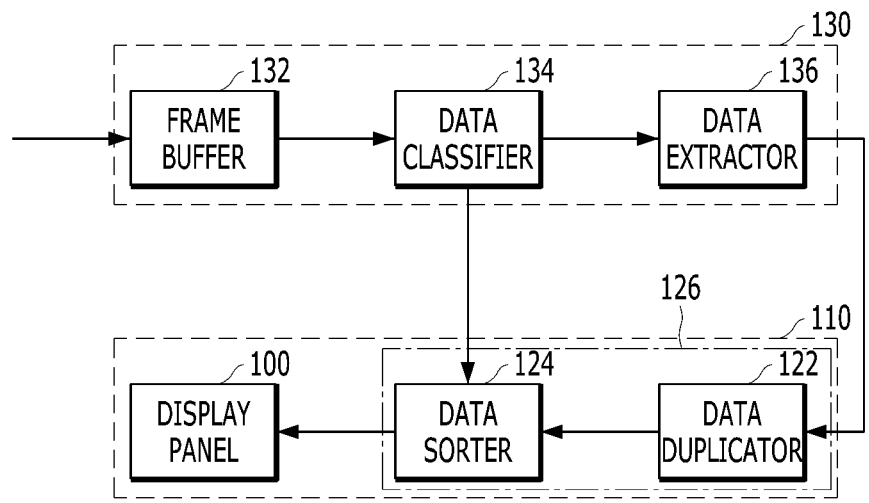
FIG. 2 is a block diagram of a virtual reality display system according to an exemplary of the present disclosure.

FIG. 2 is a block diagram of a virtual reality display system according to an exemplary aspect of the present disclosure.

The virtual reality display system illustrated in FIG. 2 may include a content provider 130 and a display device 110.

The content provider 130 may create various contents and provide the contents to the display device 110. The content provider 130 may provide contents created by terrestrial broadcast, cable broadcast, satellite broadcast, various Internet broadcasts, an application, and so on to the display device 110. For example, the content provider 130 may execute a predetermined application to transmit predetermined data (an operation execute command) to the display device 110 or receive predetermine data from the display device 110. The content provider 130 may communicate with the display device 110 in a wired and/or wireless communication fashion.

The content provider 130 according to the present disclosure may transmit main image data to be supplied to a main view region of a display panel 100 to the display device 110 without change, extract only some of auxiliary image data to be supplied to an auxiliary view region, and transmit the extracted data to the display device 110. Accordingly, the content provider 130 may transmit main image data corresponding to the number of main sub-pixels disposed in the main view region to the display device 110 and transmit auxiliary image data corresponding to a smaller number than the number of auxiliary sub-pixels arranged in the auxiliary view region to the display device 110.

The content provider 130 may include a frame buffer 132, a data classifier 134, and a data extractor 136.

The frame buffer 132 may store original image data in frame units and pre-store coordinate information and threshold pixel number information as an option value. Here, the coordinate information may be coordinate information on a main view region of the display panel 100 and the threshold pixel number information may be the number of sub-pixels of an auxiliary view region. The extracted auxiliary image data is supplied to the sub-pixels of the auxiliary view region.

Here, the coordinate information and the threshold pixel number information of the main view region of the display panel 100 may be set in consideration of, for example, product specification (e.g., size and resolution) of a display device or a distance between the display device and a user eye. That is, a total number of sub-pixels disposed in a horizontal direction of each of the main view region and the auxiliary view region may be determined according to Equation 1 below. The total number of sub-pixels disposed in a vertical direction of each of the main view region and the auxiliary view region may also be determined according to Equation 1 below, by changing horizontal components (a horizontal distance, a horizontal direction, etc.) to vertical components (a vertical distance, a vertical direction, etc.). The coordinate information of the main view region and the auxiliary view region may be calculated through the determined total number of sub-pixels.

$$y1 = x \cdot \tan\theta1 \qquad \text{[Equation 1]}$$
$$y2 = (x \cdot \tan\theta2) - y1$$
$$\text{Total number of horizontal pixels of main view region} = \frac{y1}{y1 + y2} \times H$$
$$\text{Total number of horizontal pixels of auxiliary view region} = \frac{y2}{y1 + y2} \times H$$

Figure 3:
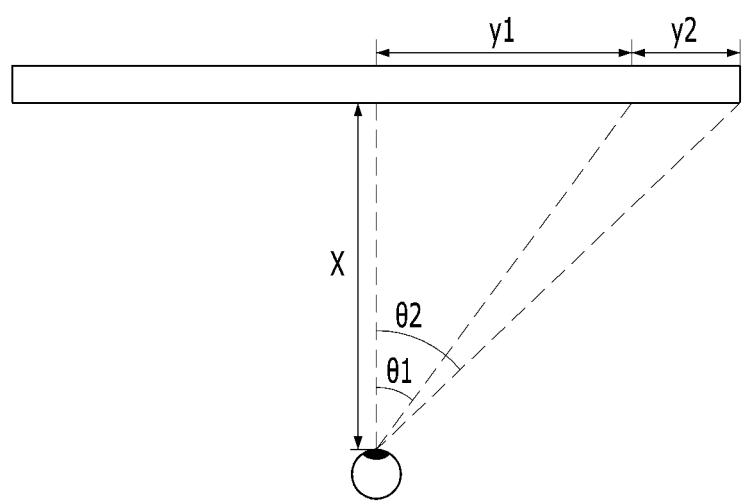
FIG. 3 is a diagram for explanation of a method of setting a main view region and an auxiliary view region of a display panel illustrated in FIG. 2.

Here, as illustrated in FIG. 3, x is a distance to a user eye from a central sub-pixel of the display panel 100, θ1 is half of a main viewing angle at which a focal point is formed when a user eye is directed to the front of the display panel 100, θ2 is an angle between an imaginary line to a user eye from the central sub-pixel of the display panel 100 and an imaginary inclined line to the user eye from an outermost sub-pixel of the display panel 100, y1 is a horizontal distance of the display panel 100 corresponding to half of the main view region, y2 is a horizontal distance of the display panel 100, corresponding to half of the auxiliary view region, and H is a total number of pixels arranged in a horizontal direction of the display panel 100.

Figure 4:
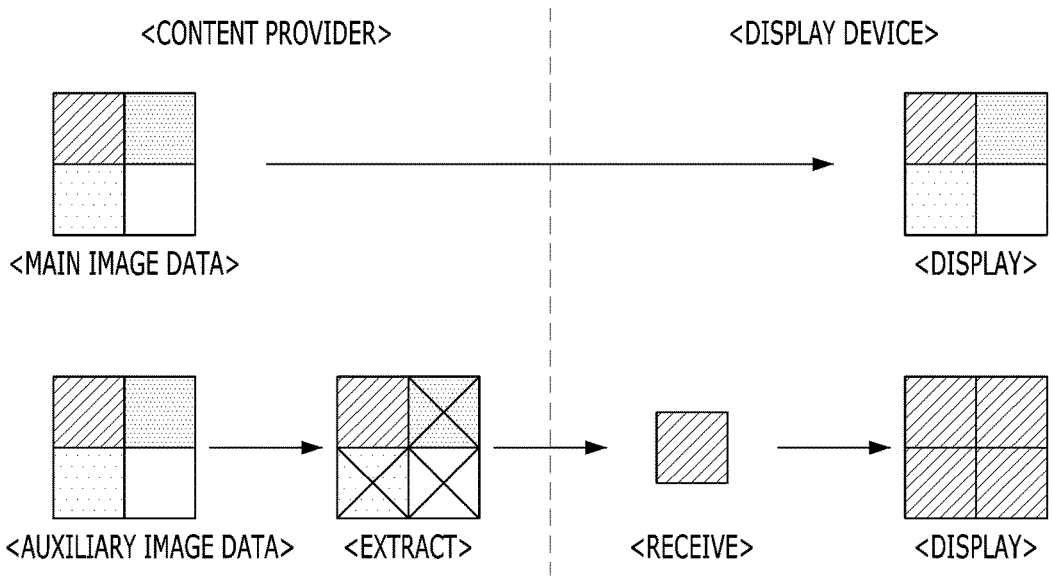
FIG. 4 is a diagram for explanation of transmission flow of main image data supplied to a main view region and auxiliary image data supplied to an auxiliary view region in the display panel illustrated in FIG. 2.

The data classifier 134 may classify input image data into main image data to be supplied to the main view region and auxiliary image data to be supplied to the auxiliary view region. This classification is based on the coordinate information of the main view region of the display panel 100. The classified main image data may be transmitted to the display device 110 without change in volume, as illustrated in FIG. 4.

The data extractor 136 may extract some auxiliary image data based on the threshold pixel number information in the classified auxiliary image data. For example, when pixel threshold information is four, one piece of auxiliary image data may be extracted per four pieces of auxiliary image data provided. The extracted auxiliary image data may be transmitted to the display device 110, as illustrated in FIG. 4. The data extractor may extract average data of the four pieces of auxiliary image data and transmit the average data to the display device 110. The data extracted can be luminescence data. Accordingly, the data extractor 136 may extract auxiliary image data obtained by multiplying all pieces of the classified auxiliary image data by the pixel threshold information.

The display device 110 may embody an image on the display panel 100 using auxiliary image data that is duplicated so as to match the extracted auxiliary image data and the threshold pixel number information and the main image data from the data classifier 134. To this end, the display device 110 may include an image processor 126 including a data duplicator 122 and a data sorter 124.

The data duplicator 122 may receive the auxiliary image data extracted from the data extractor 136 and duplicate the extracted auxiliary image data to correspond to the threshold pixel number information. For example, when threshold pixel number information per piece of representative image data is four, four pieces of the same duplicated auxiliary image data as the extracted auxiliary image data may be generated.

The data sorter 124 may receive the auxiliary image data duplicated through the data duplicator 122 and the main image data transmitted through the data classifier 134 and sort the received main image data and the duplicated auxiliary image data.

Figure 5:
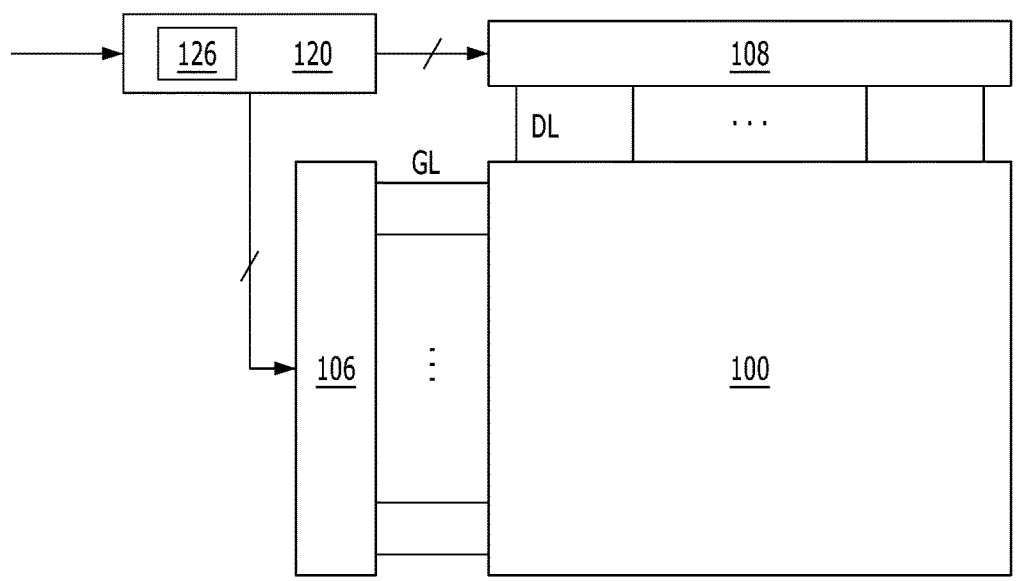
FIG. 5 is a block diagram illustrating a display device illustrated in FIG. 2 in detail.

The image processor 126 including the data duplicator 122 and the data sorter 124 may be installed in a timing controller 120 to be integrated into the timing controller 120 as one driving integrated circuit, as illustrated in FIG. 5. The display device 110 may include a panel driver including the timing controller 120, a gate driver 106, and a data driver 108, and the display panel 100, as illustrated in FIG. 5.

The timing controller 120 may sort the auxiliary image data duplicated through the data duplicator 122 and the main image data transmitted through the data classifier 134 and supply the sorted data to the data driver 108. The timing controller 120 may generate a gate control signal for control of the gate driver 106 and a data control signal for control of the data driver 108 using a plurality of synchronization signals input through the content provider 130.

The gate driver 106 may sequentially drive gate lines, GLs, of the display panel 100 in response to a gate control signal from the timing controller 120. The gate driver 106 may supply a high-state scan pulse every corresponding scan period of each gate line GL and supply a low-state scan pulse for the remaining period in which the gate line GL is driven.

The data driver 108 may convert digital data from the timing controller 120 into an analog data voltage and supply the converted data voltage to data lines, DLs, whenever each gate line GL is driven, in response to a data control signal from the timing controller 120. In particular, the data driver 108 may convert the main image data from the timing controller 120 into an analog data voltage and supply the converted analog data voltage to data lines DLs of the main view region of the display panel 100, and may convert the duplicated auxiliary image data into an analog data voltage and supply the converted analog data voltage to data lines DLs of the auxiliary view region of the display panel 100.

The display panel 100 may display an image through unit pixels that are arranged in a matrix form. The unit pixel may include red (R), green (G), and blue (B) sub-pixels (SP) or red (R), green (G), blue (B), and white (W) sub-pixels (SP). The display panel 100 may be a liquid crystal display panel, an organic light emitting display panel, or the like.

Figure 6A:
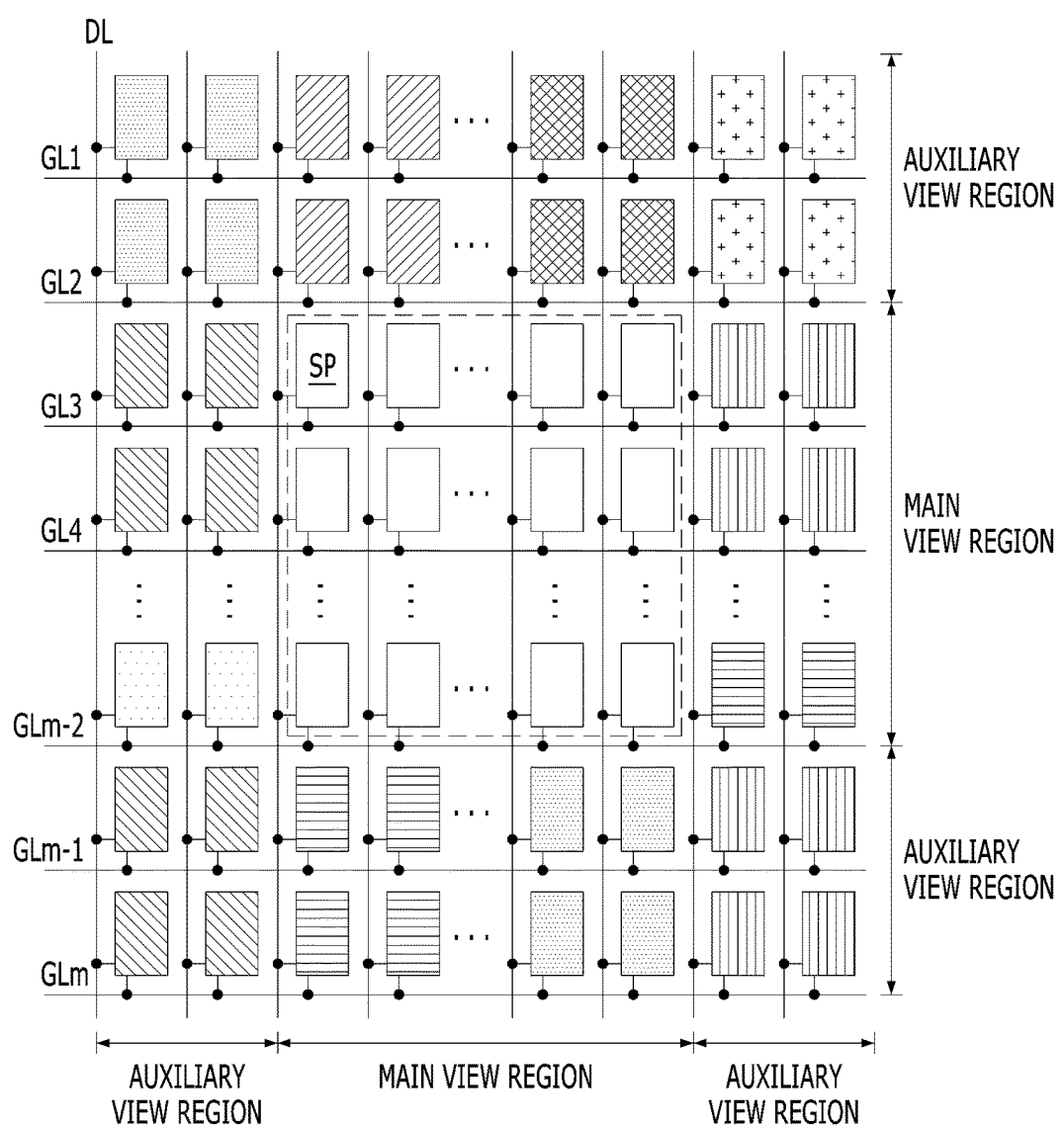
FIGS. 6A and 6B are diagrams illustrating a main view region and an auxiliary view region of the display panel illustrated in FIG. 2.
Figure 6B:
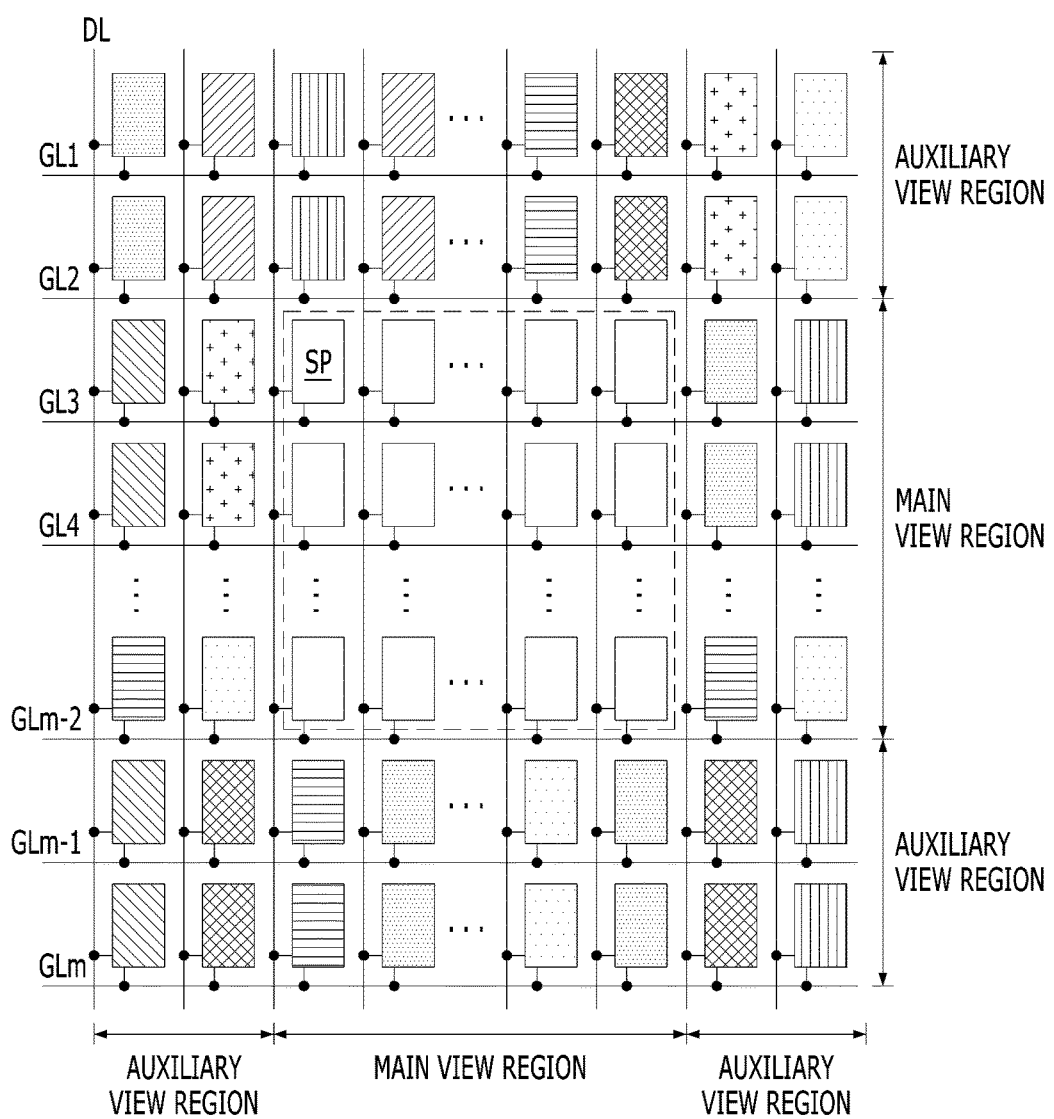

The display panel 100 may include a main view region on which a user eye is accurately focused and an auxiliary view region on which a user eye is not accurately focused, as illustrated in FIGS. 6A and 6B. In this case, the auxiliary view region may be disposed at upper/lower/right/left edges of the main view region.

Main image data may be supplied to the main sub-pixels of the main view region and duplicated auxiliary image data corresponding to the number of pieces of the threshold pixel number information may be supplied to the auxiliary sub-pixels of the auxiliary view region. For example, when threshold pixel number information is four, the same auxiliary image data may be supplied in units of four 2×2 sub-pixels arranged in the auxiliary view region as illustrated in FIG. 6A, or the same auxiliary image data may be supplied in units of four 1×4 or 4×1 sub-pixels. When the threshold pixel number information is two, the same auxiliary image data may be supplied in units of two 1×2 sub-pixels arranged in the auxiliary view region or the same auxiliary image data may be supplied in units of two 2×1 sub-pixels, as illustrated in FIG. 6B.

As such, in a virtual reality display system according to the present disclosure, the same auxiliary image data may be supplied to sub-pixels of the auxiliary view region on which a user eye is not accurately focused so as to perform blurring on the auxiliary view region. Accordingly, the virtual reality display system according to the present disclosure may reduce a volume of auxiliary image data supplied to the auxiliary view region to overcome latency.

Figure 7:
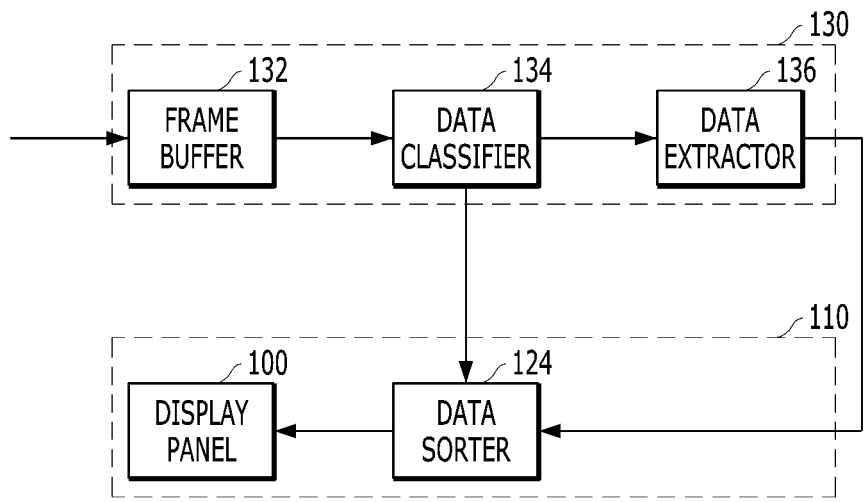
FIG. 7 is a block diagram illustrating a virtual reality display system according to another exemplary of the present disclosure.

FIG. 7 is a block diagram illustrating a virtual reality display system according to another exemplary of the present disclosure.

The virtual reality display system illustrated in FIG. 7 may include the same components as those of FIG. 2 except that neighbor auxiliary sub-pixels disposed in the auxiliary view region share the same auxiliary image data without a data duplicator, compared with the virtual reality display system illustrated in FIG. 2.

The data sorter 124 may receive main image data transmitted through the data classifier 134 and auxiliary image data extracted through the data extractor 136 and sort the received main image data and auxiliary image data.

Figure 8A:
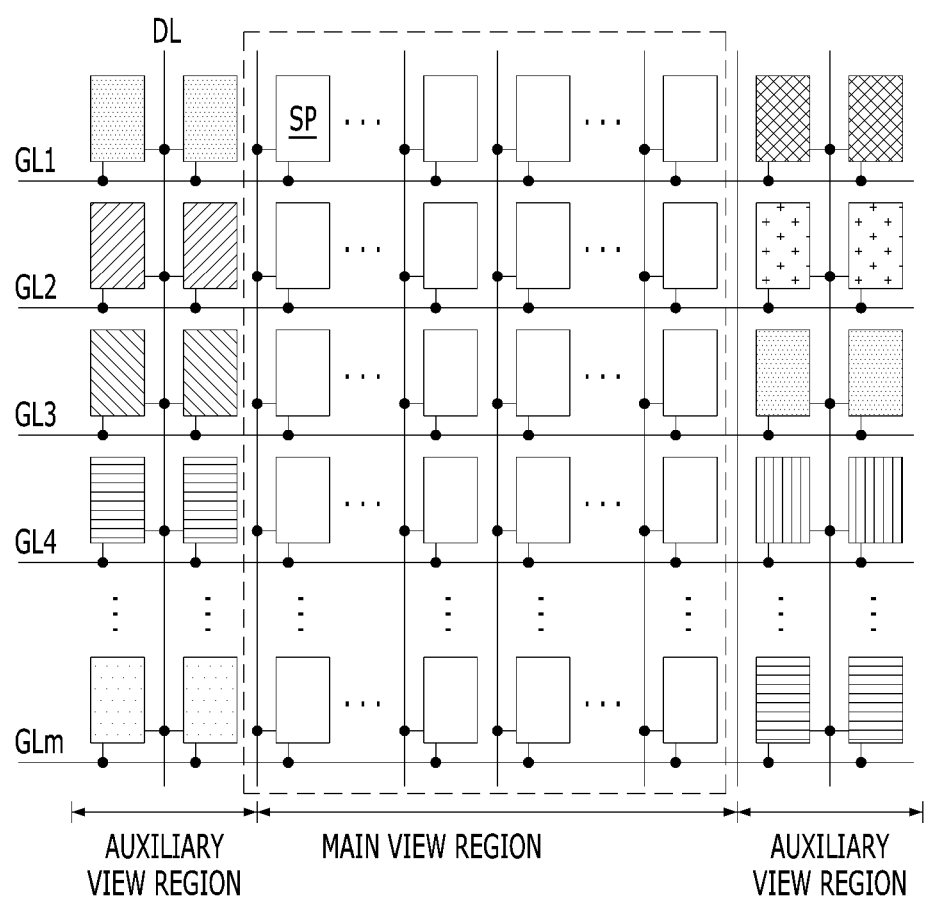
FIGS. 8A and 8B are diagrams illustrating a main view region and an auxiliary view region of a display panel illustrated in FIG. 7.
Figure 8B:
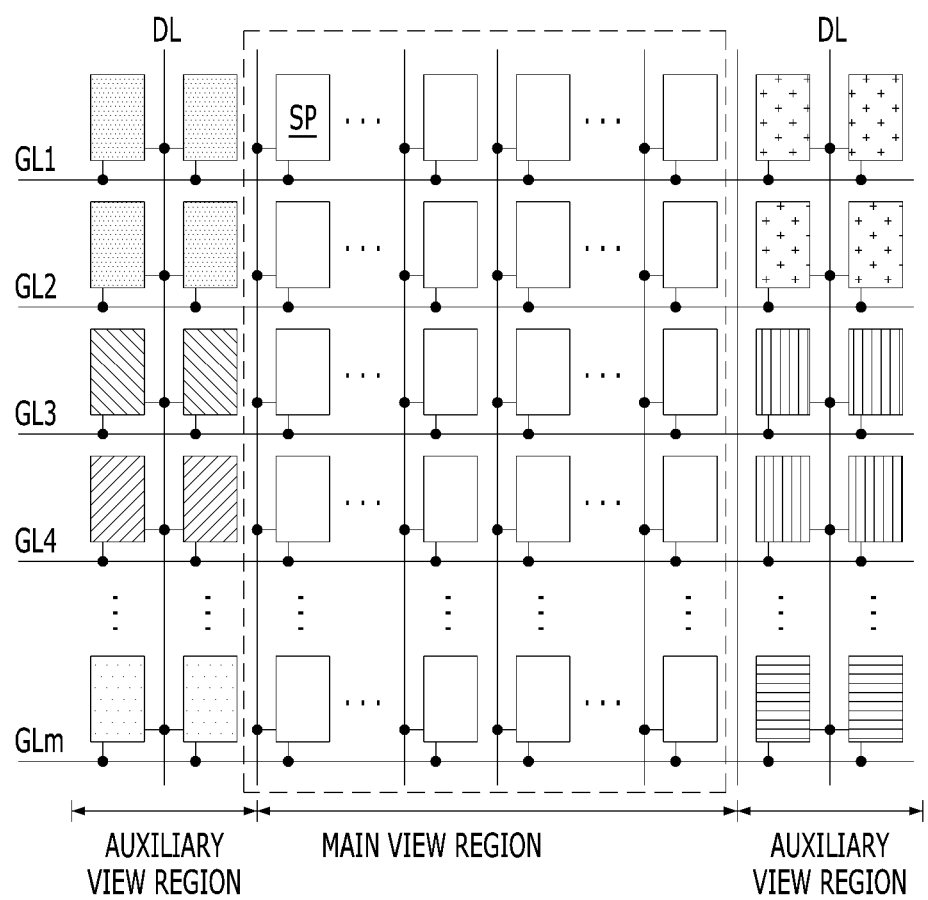

As illustrated in FIGS. 8A and 8B, the display panel 100 may include a main view region on which a user eye is accurately focused and an auxiliary view region on which a user eye is not accurately focused. In this case, the auxiliary view region may be disposed at right/left edges of the main view region and auxiliary sub-pixels, the number of which corresponds to pieces of the threshold pixel number information, may share one data line. Accordingly, auxiliary sub-pixels, the number of which corresponds to pieces of the threshold pixel number information, may share the same auxiliary image data.

In detail, as illustrated in FIG. 8A, when the threshold pixel number information is two, two 1×2 auxiliary sub-pixels that are adjacently disposed in a right and left direction in the auxiliary view region may be connected to the same data line DL disposed between the two auxiliary sub-pixels. Accordingly, the auxiliary sub-pixels that are adjacently disposed in a right and left direction may share the same auxiliary image data. When the threshold pixel number information is four, four auxiliary sub-pixels disposed in the auxiliary view region may be connected to the same data line DL as illustrated in FIG. 8B. For example, four 2×2 auxiliary sub-pixels that are adjacently disposed in upper, lower, right, and left directions may be connected to one data line DL or four 1×4 auxiliary sub-pixels that are adjacently disposed in a right and left direction (in a horizontal direction) may be connected to one data line DL. Accordingly, four auxiliary sub-pixels that are adjacently disposed in upper, lower, right, and left directions or in right and left directions may share the same auxiliary image data. As illustrated in FIGS. 8A and 8B, a plurality of auxiliary sub-pixels may be connected to one data lien DL may share one thin film transistor.

Accordingly, in the virtual reality display system illustrated in FIG. 7, at least two auxiliary sub-pixels disposed in the auxiliary view region may share one data line so as to reduce a total number of data lines. The number of channels of a data driver integrated circuit that applies a data voltage to a data line may be reduced by as much as the reduced total number of data lines, thereby reducing costs.

FIG. 9 is a diagram for explanation of a method of driving a virtual reality display system according to the present disclosure.

Referring to FIG. 9, original image data 51 may be classified into main image data and auxiliary image data based on coordinate information of the main view region. That is, when a coordinate for embodying the original image data corresponds to the main view region of a display panel (S2), the data may be classified into the main image data (S3) and when the coordinate for embodying the original image data does not correspond to main view region of the display panel (S2), the data may be classified into the auxiliary image data (S4).

The classified main image data may be supplied to the main view region of a display to embody a corresponding image (S5). In addition, the auxiliary image data may be extracted based on threshold pixel number information in the classified auxiliary image data (S6). The extracted auxiliary image data may be transmitted to a display device and the transmitted auxiliary image data may be duplicated based on the threshold pixel number information (S7). The duplicated auxiliary image data may be supplied to the auxiliary view region of the display panel to embody a corresponding image (S5).

As such, according to the present disclosure, some auxiliary image data may be extracted among auxiliary image data of the auxiliary view region generated from a content unit and transmitted to the display device. In this case, the number of auxiliary image data input to the display device is smaller than the number of auxiliary sub-pixels and, thus, processing speed of a central processing unit (CPU), a graphic processing unit (GPU), and a frame buffer, which are disposed in the display device, may be enhanced. Accordingly, according to the present disclosure, latency proportional to the processing speed of the, for example, CPU, the GPU, and the frame buffer may be overcome. In the virtual reality display system according to the present disclosure, the same auxiliary image data may be supplied to sub pixels of the auxiliary view region on which a user eye is not accurately focused to perform blurring on the auxiliary view region.

Accordingly, the virtual reality display system according to the present disclosure may reduce a volume of auxiliary image data supplied to the auxiliary view region to overcome latency. In addition, in the virtual reality display system according to the present disclosure, a plurality of auxiliary sub-pixels may share one data line, reducing a total number of data lines. The number of channels of a data driver integrated circuit that applies a data voltage to a data line may be reduced by as much as the reduced total number of data lines, thereby reducing costs.

In the virtual reality display system according to the present disclosure, the same auxiliary image data may be supplied to sub pixels of the auxiliary view region on which a user eye is not accurately focused to perform blurring on the auxiliary view region. Accordingly, the virtual reality display system according to the present disclosure may reduce a volume of auxiliary image data supplied to the auxiliary view region to overcome latency.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display system for virtual reality, comprising:
 a display device comprising a display panel having a main view region comprising a plurality of main view region pixels and an auxiliary view region comprising a plurality of auxiliary view region pixels, wherein the main view region receives main content data and the auxiliary view region receives auxiliary content data; and
 a content providing device configured to transmit the main content data corresponding to the plurality of main view region pixels and to transmit a subset of the auxiliary content data corresponding to a number smaller than the plurality of auxiliary view region pixels,
 wherein the display device supplies the subset of the auxiliary content data to a plurality of neighbor auxiliary view region pixels and performs blurring on the auxiliary view region to reduce a volume of the auxiliary content data supplied to the auxiliary view region to overcome latency, and
 wherein coordinate information of the main view region and the auxiliary view region is calculated through a total number of horizontal pixels of the main view region $\{y_1/(y_1+y_2)\} \times H$ and a total number of horizontal pixels of the auxiliary view region $\{y_2/(y_1+y_2)\} \times H$,
 where $y_1 = x \tan \theta_1$, $y_2 = (x \tan \theta_2) - y_1$, x is a distance to a user eye from a central sub-pixel of the display panel, $\theta_1$ is half of a main viewing angle at which a focal point is formed when a user eye is directed to a front of the display panel, $\theta_2$ is an angle between an imaginary line to a user eye from the central sub-pixel of the display panel and an imaginary inclined line to the user eye from an outermost sub-pixel of the display panel, $y_1$ is a horizontal distance of the display panel corresponding to half of the main view region, $y_2$ is a horizontal distance of the display panel corresponding to half of the auxiliary view region, and H is a total number of pixels arranged in a horizontal direction of the display panel.

2. The display system for virtual reality according to claim 1, wherein the content providing device classifies original content data into the main content data corresponding to the plurality of main view region pixels and the auxiliary content data corresponding to the plurality of auxiliary view region pixels, wherein the content providing device extracts the subset of auxiliary content data, and transmits the extracted auxiliary content data to the display device.

3. The display system for virtual reality according to claim 1, wherein the content providing device comprises:
 a data classifier configured to classify original content data into the main content data, corresponding to a number of the main view region pixels, and the auxiliary content data, corresponding to a number of the auxiliary view region pixels, and a data extractor configured to extract the subset of auxiliary content data, from the classified auxiliary content data, and to transmit the extracted subset of auxiliary content data and the main content data to the display device.

4. The display system for virtual reality according to claim 3, wherein the data extractor extracts a subset of a plurality of average data from the classified auxiliary content data and transmits the extracted subset of a plurality of average data to the display device.

5. The display system for virtual reality according to claim 4, wherein the subset of the plurality of average data includes data for at least one region of four pixels, and the data extractor extracts one piece of average data from the data for at least one region of four pixels.

6. The display system for virtual reality according to claim 2, wherein the display device comprises:
a panel driver configured to drive the display panel; and
an image processor configured to duplicate the extracted subset of auxiliary content data, wherein the duplicated auxiliary content data corresponds to a number of auxiliary view region pixels in the auxiliary view region and the image processor supplies the duplicated subset of auxiliary content data and the main content data to the panel driver.

7. The display system for virtual reality according to claim 6, wherein the auxiliary view region is disposed adjacent to an upper side, a lower side, a right side and a left side of the main view region.

8. The display system for virtual reality according to claim 2, wherein:
in the display panel, a plurality of auxiliary view region pixels adjacently disposed in the auxiliary view region share one data line; and the display device supplies the subset of the auxiliary content data to the adjacent plurality of auxiliary view region pixels through the shared data line.

9. The display system for virtual reality according to claim 8, wherein the auxiliary view region is disposed adjacent to a right side and a left side of the main view region.

10. A method of driving a display system comprising a display panel having a main view region with a plurality of main view region pixels and an auxiliary view region with a plurality of auxiliary view region pixels, the method comprising:
transmitting main content data corresponding to the plurality of main view region pixels arranged in the main view region and a subset of auxiliary content data corresponding to the plurality of auxiliary view region pixels to the display device, wherein the subset of auxiliary content data is smaller than the plurality of auxiliary view region pixels disposed in the auxiliary view region; and
supplying the subset of auxiliary content data to the plurality of auxiliary view region pixels of the display device,
wherein the display system performs blurring on the auxiliary view region to reduce a volume of the auxiliary content data supplied to the auxiliary view region to overcome latency, and
wherein coordinate information of the main view region and the auxiliary view region is calculated through a total number of horizontal pixels of the main view region $\{y_1/(y_1+y_2)\} \times H$ and a total number of horizontal pixels of the auxiliary view region $\{y_2/(y_1+y_2)\} \times H$, where $y1=x \tan \theta 1$, $y2=(x \tan \theta 2)-y1$, x is a distance to a user eye from a central sub-pixel of the display panel, $\theta 1$ is half of a main viewing angle at which a focal point is formed when a user eye is directed to a front of the display panel, $\theta 2$ is an angle between an imaginary line to a user eye from the central sub-pixel of the display panel and an imaginary inclined line to the user eye from an outermost sub-pixel of the display panel, y1 is a horizontal distance of the display panel corresponding to half of the main view region, y2 is a horizontal distance of the display panel corresponding to half of the auxiliary view region, and H is a total number of pixels arranged in a horizontal direction of the display panel.

11. The method according to claim 10, wherein the transmitting comprises:
classifying original content data into the main content data corresponding to the plurality of main view region pixels and auxiliary content data corresponding to the plurality of auxiliary view region pixels;
extracting the subset of auxiliary content data, from the classified auxiliary content data, wherein the subset of the auxiliary content data is smaller than the plurality of auxiliary view region pixels; and
transmitting the extracted subset of auxiliary content data to the display device.

12. The method according to claim 11, wherein the supplying further comprises:
duplicating the extracted subset of auxiliary content data to correspond to a number of the auxiliary view region pixels; and
supplying the duplicated subset of auxiliary content data to the display device.

13. The method according to claim 10, further comprising:
sharing, in the display panel, one data line between a plurality of auxiliary view region pixels adjacently disposed in the auxiliary view region; and
supplying the subset of the auxiliary content data to the adjacent auxiliary view region pixels through the shared data line.

14. A display system for virtual reality, comprising:
a display device comprising a display panel having a main view region and an auxiliary view region;
a content providing device comprising a frame buffer, a data classifier, and a data extractor;
the frame buffer stores the content data;
the data classifier classifies the stored content data into main content data and auxiliary content data, wherein the main content data is supplied to the main view region and the auxiliary content data is supplied to the auxiliary view region;
the data extractor extracts at least one piece of the auxiliary content data; and
the content providing device provides the main content data to the main view region and the at least one piece of the auxiliary content data to the auxiliary view region, wherein the display system performs blurring on the auxiliary view region to reduce a volume of the auxiliary content data supplied to the auxiliary view region to overcome latency, and
wherein coordinate information of the main view region and the auxiliary view region is calculated through a total number of horizontal pixels of the main view region $\{y_1/(y_1+y_2)\} \times H$ and a total number of horizontal pixels of the auxiliary view region $\{y_2/(y_1+y_2)\} \times H$, where y1=x tan θ1, y2=(x tan θ2)−y1, x is a distance to a user eye from a central sub-pixel of the display panel, θ1 is half of a main viewing angle at which a focal point is formed when a user eye is directed to a front of the display panel, θ2 is an angle between an imaginary line to a user eye from the central sub-pixel of the display panel and an imaginary inclined line to the user eye from an outermost sub-pixel of the display panel, y1 is a horizontal distance of the display panel corresponding to half of the main view region, y2 is a horizontal distance of the display panel corresponding to half of the auxiliary view region, and H is a total number of pixels arranged in a horizontal direction of the display panel.

15. The display system for virtual reality of claim 14, wherein the display device supplies the extracted at least one piece of auxiliary content data to neighbor auxiliary sub-pixels.

16. The display system for virtual reality of claim 14, wherein the main content data corresponds to a number of main sub-pixels arranged in the main view region and the extracted at least one piece of the auxiliary content data corresponds to a number smaller than a number of auxiliary sub-pixels disposed in the auxiliary view region.

17. The display system for virtual reality of claim 14, wherein the frame buffer stores a threshold pixel number, which is used to determine an amount of auxiliary content data supplied for the auxiliary view region.

18. The display system for virtual reality of claim 17, wherein based on a threshold pixel number of four, the data extractor extracts one piece of auxiliary content data for every four pieces of auxiliary content data supplied for the auxiliary view region.

19. The display system for virtual reality of claim 18, wherein the extracted one piece of auxiliary content data is average data.

20. The display system for virtual reality according to claim 16, wherein the display device comprises:
- a panel driver configured to drive the display panel; and
- an image processor configured to duplicate the extracted at least one piece of auxiliary content data to correspond to the number of the auxiliary sub-pixels and to supply the duplicated at least one piece of auxiliary content data and the main content data to the panel driver.

* * * * *